Aug. 2, 1955　　　A. S. DINSMORE ET AL　　　2,714,324
WORK-HANDLING MECHANISM FOR A MACHINE TOOL
Filed July 24, 1952　　　　　　　　　　　　　　　7 Sheets-Sheet 1
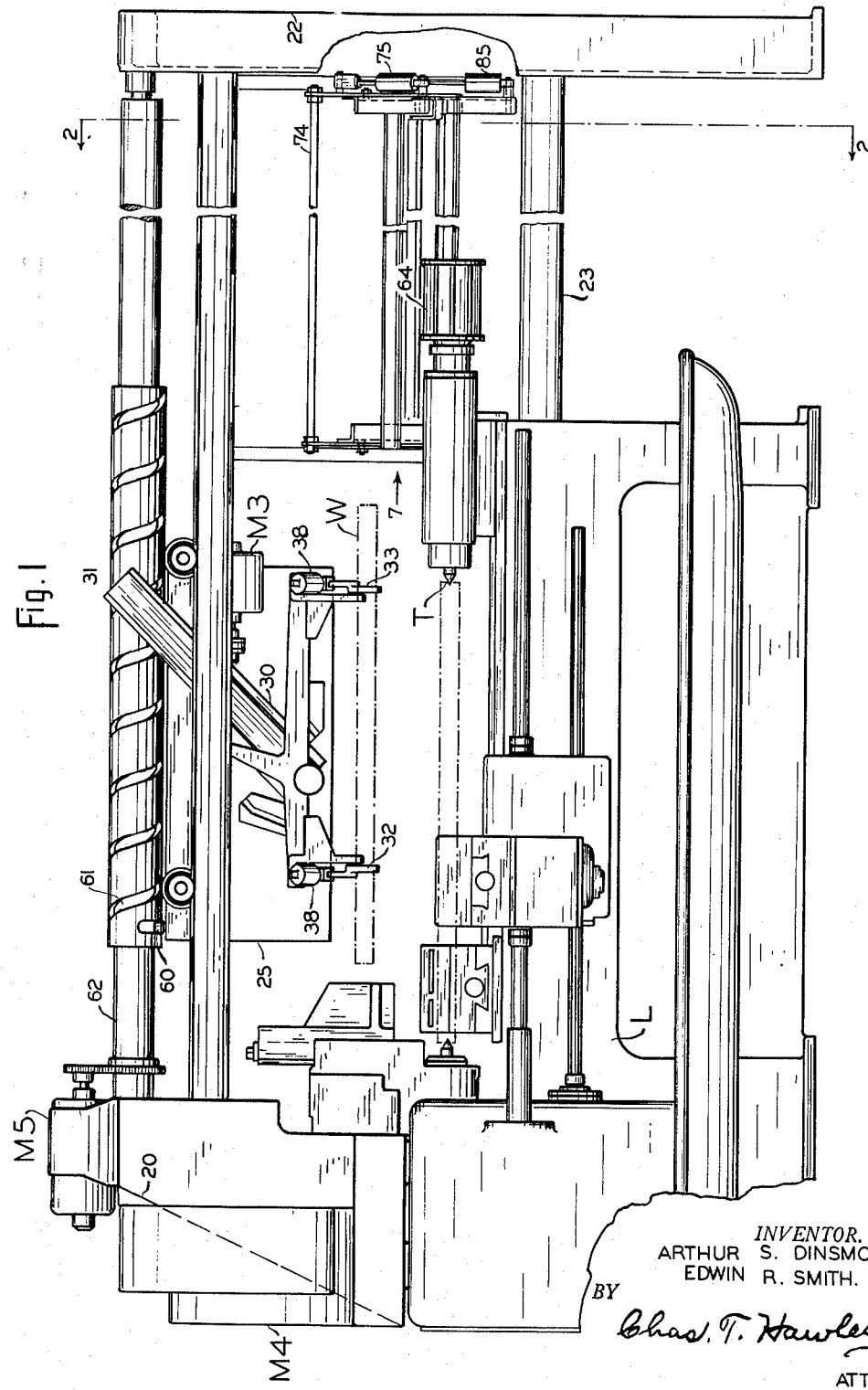
INVENTOR.
ARTHUR S. DINSMORE.
EDWIN R. SMITH.
BY Chas. T. Hawley
ATT'Y.

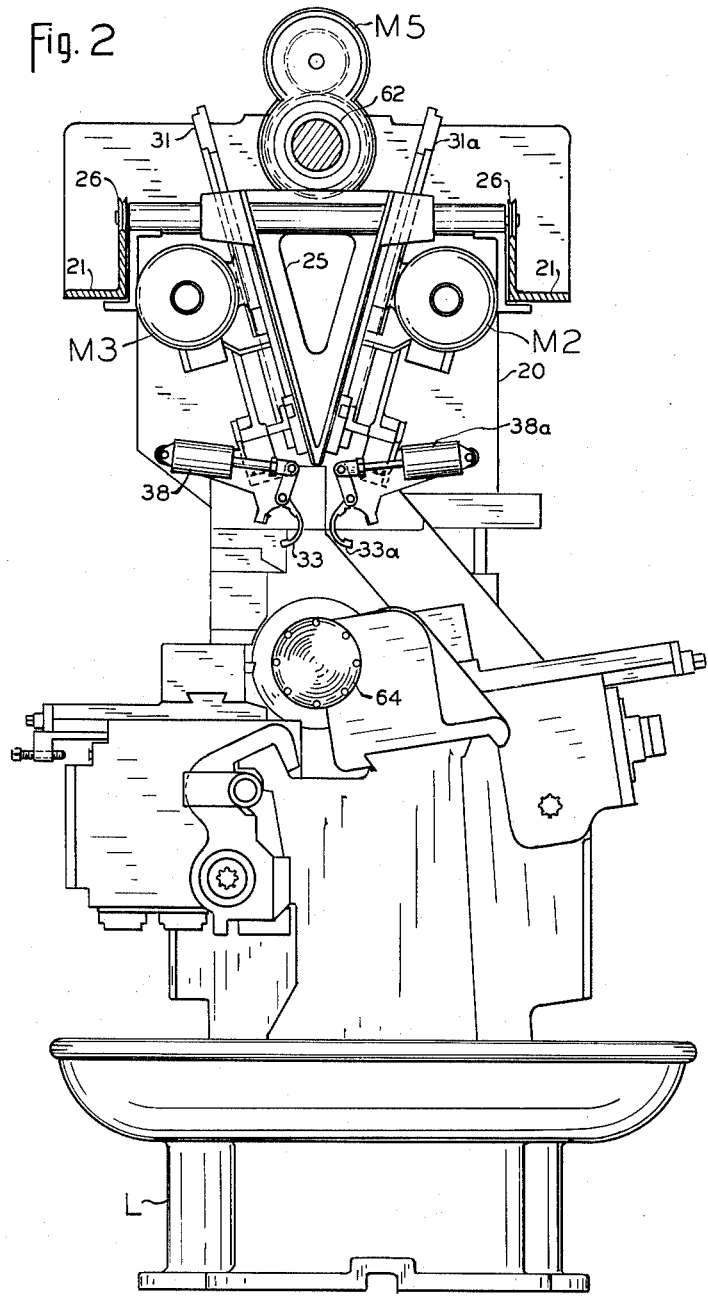

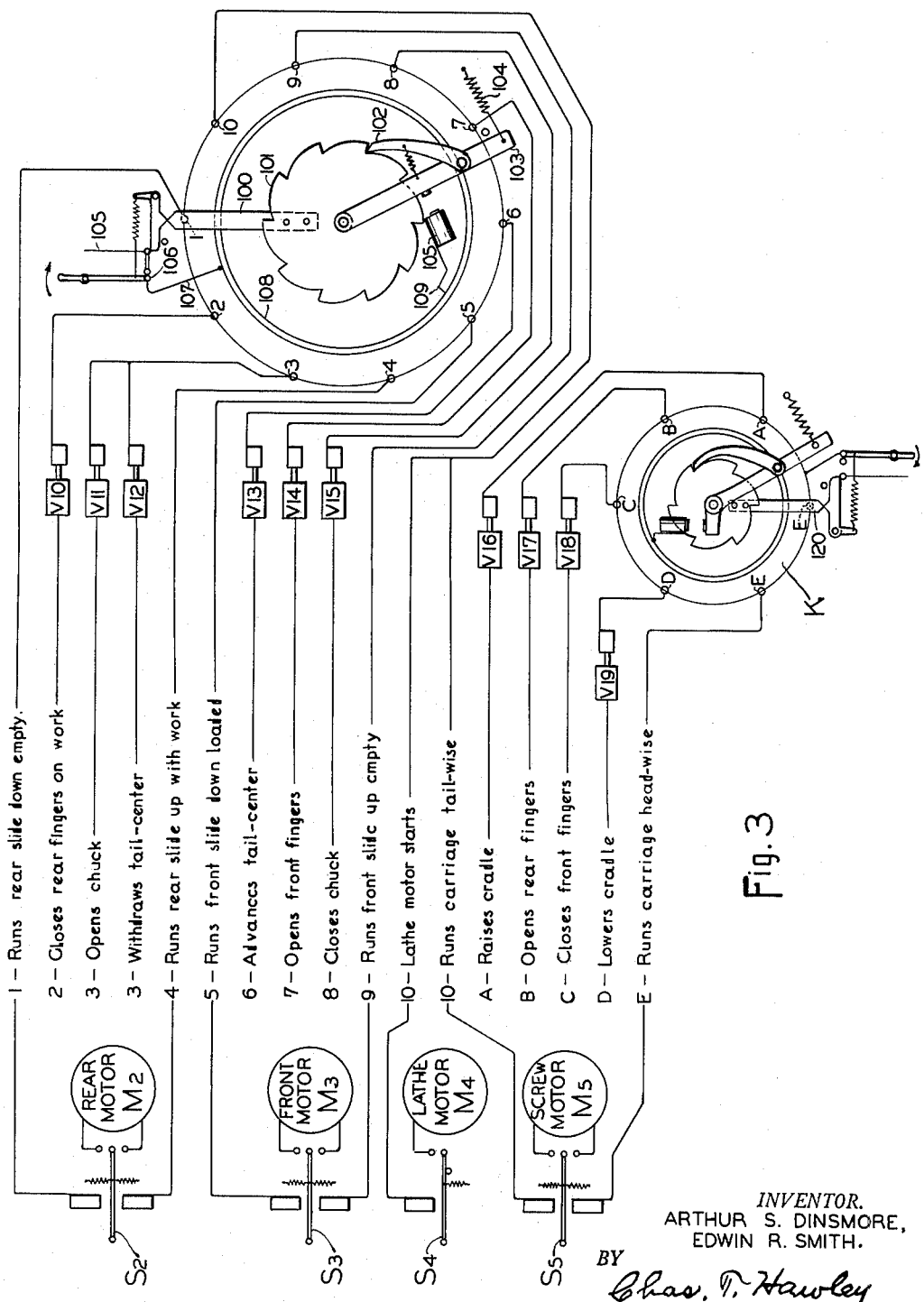

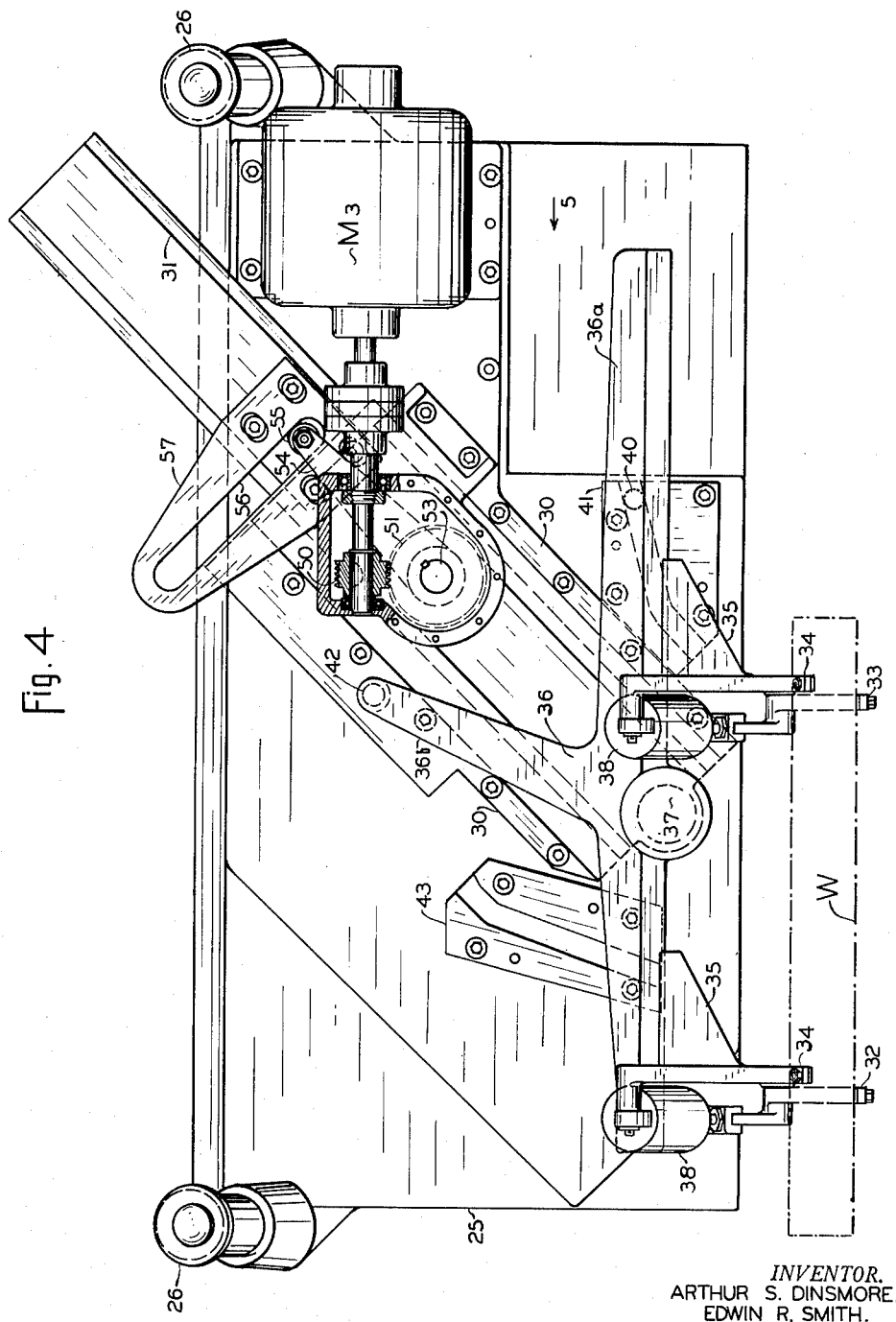

Aug. 2, 1955  A. S. DINSMORE ET AL  2,714,324
WORK-HANDLING MECHANISM FOR A MACHINE TOOL
Filed July 24, 1952  7 Sheets-Sheet 5
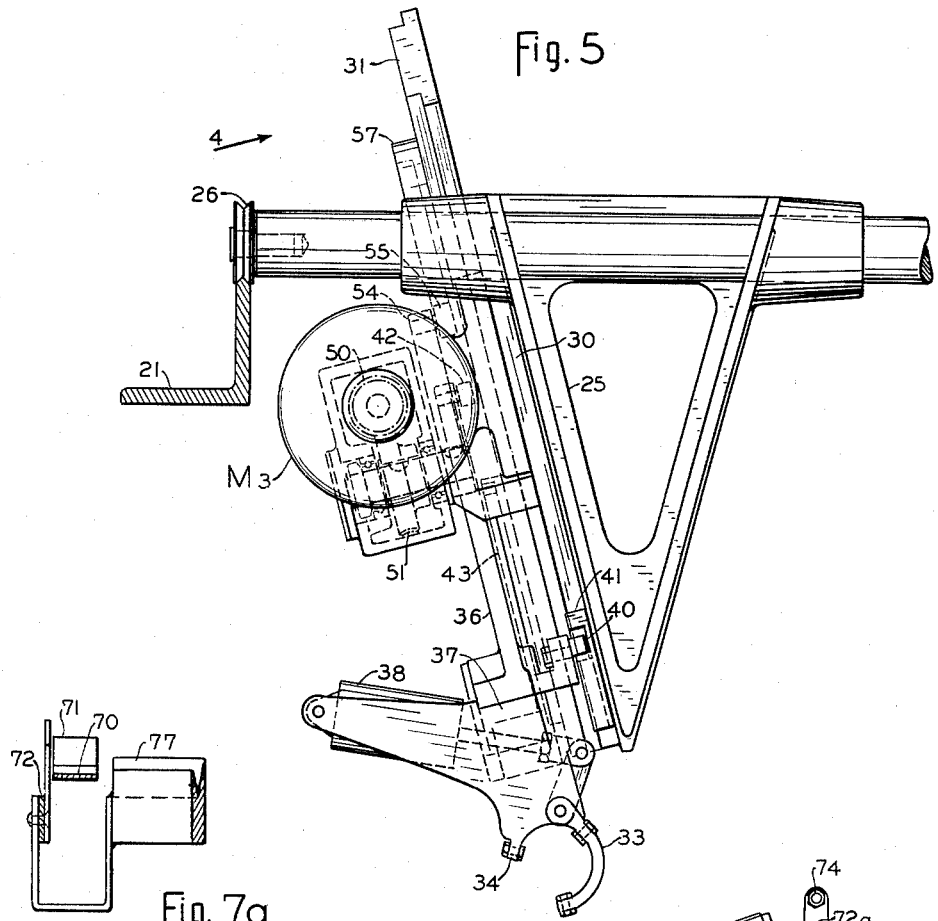
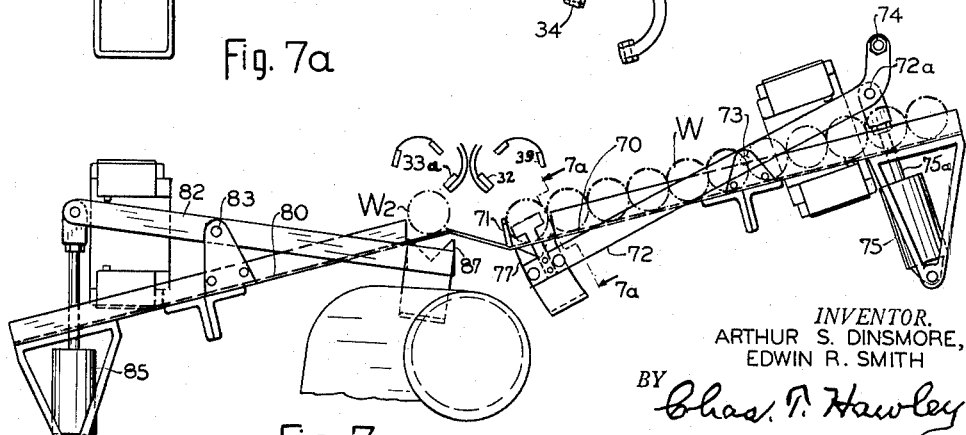
INVENTOR.
ARTHUR S. DINSMORE,
EDWIN R. SMITH
BY Chas. T. Hawley
ATT'Y.

Aug. 2, 1955          A. S. DINSMORE ET AL          2,714,324
              WORK-HANDLING MECHANISM FOR A MACHINE TOOL
Filed July 24, 1952                                 7 Sheets-Sheet 6

INVENTOR.
ARTHUR S. DINSMORE.
EDWIN R. SMITH.
BY Chas. T. Hawley
                                              ATT'Y.

*INVENTOR.*
ARTHUR S. DINSMORE,
EDWIN R. SMITH.
BY Chas. T. Hawley
ATT'Y.

United States Patent Office 2,714,324
Patented Aug. 2, 1955

2,714,324

WORK-HANDLING MECHANISM FOR A MACHINE TOOL

Arthur Sumner Dinsmore and Edwin R. Smith, Seneca Falls, N. Y., assignors to Seneca Falls Machine Company, Seneca Falls, N. Y., a corporation of Massachusetts Application July 24, 1952, Serial No. 300,708

6 Claims. (Cl. 82—2.7)

This invention relates to mechanism for removing finished work-pieces from a machine tool and for supplying new work-pieces to said machine tool.

It is the general object of this invention to provide work-handling mechanism so designed that the discharge of a finished piece from the unloading part of the mechanism and the supply of a new piece to the loading part of the mechanism will take place at a station which is substantially removed axially from the operative locus of the lathe or other machine tool.

A further object is to provide work-handling mechanism which is particularly adapted to the handling of relatively long work-pieces such as rods and shafts.

We also provide improved mechanism by which one end of a relatively long work-piece may be presented to a chuck or other work-driving member by a generally axial movement and may be thereafter reversely removed therefrom.

Our invention further relates to arrangements and combinations of parts which will be hereinafter described and more particularly pointed out in the appended claims.

A preferred form of the invention is shown in the drawings, in which

Fig. 1 is a front elevation of a lathe having our improved work-handling mechanism associated therewith;

Fig. 2 is a sectional end elevation, taken along the line 2—2 in Fig. 1;

Fig. 3 is a diagrammatic control and operation chart;

Fig. 4 is an enlarged and somewhat inclined front elevation of a work-handling slide and associated parts, looking in the direction of the arrow 4 in Fig. 5;

Fig. 5 is a right-hand end view of the parts shown in Fig. 4;

Fig. 7 is a side elevation of cradle mechanism for presenting a new piece to the work-handling mechanism, and for receiving a finished work-piece therefrom, looking in the direction of the arrow 7 in Fig. 1;

Fig. 7a is a detail sectional view of certain parts, taken along the line 7a—7a in Fig. 7.

Figure 6:
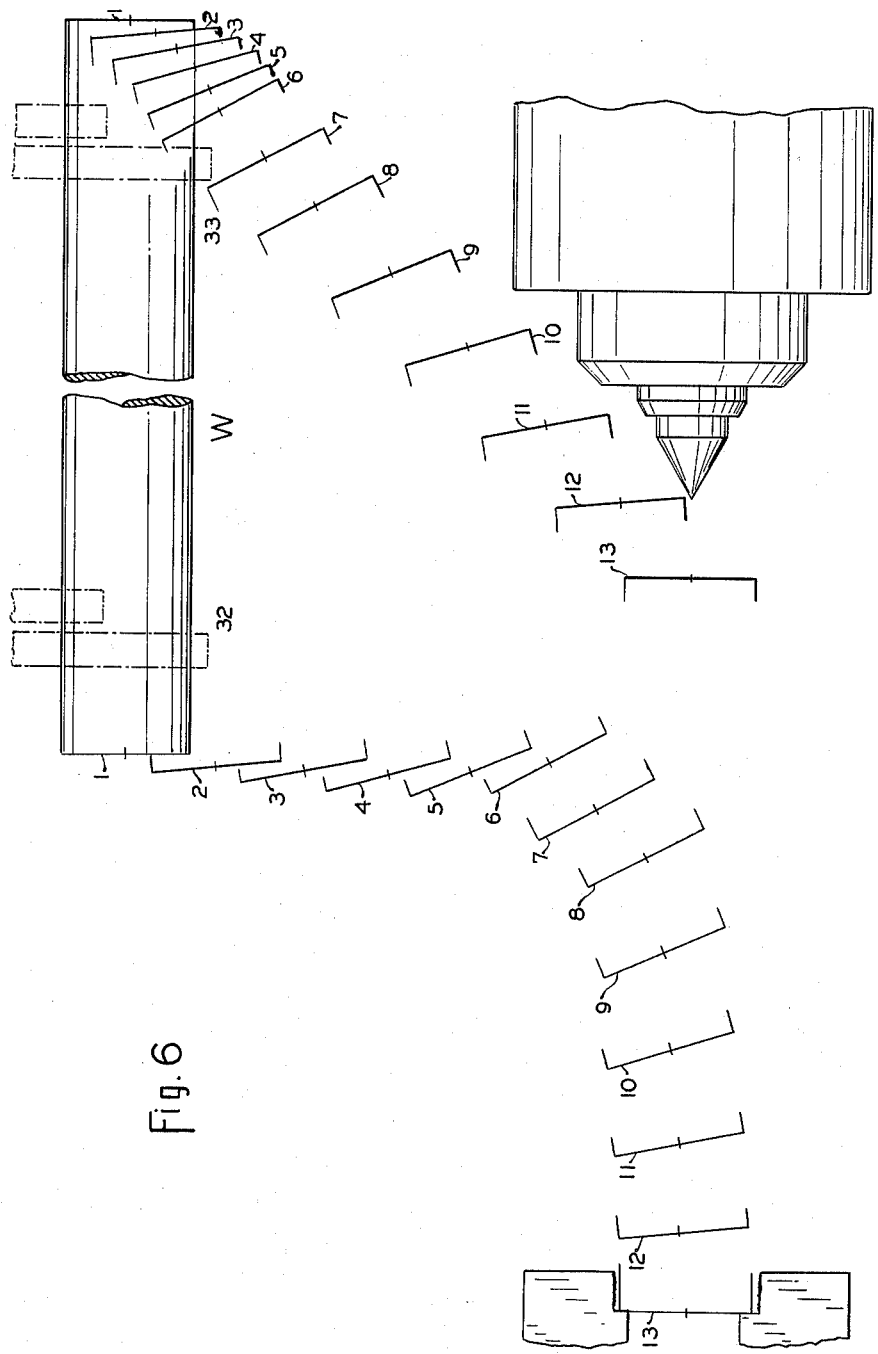
Fig. 6 is a motion diagram indicating successive positions of a new work-piece during insertion.

Referring particularly to Figs. 1 and 2, we have shown our improved work-handling mechanism in association with a lathe L of commercial type. The work-handling mechanism is mounted on a rigid frame comprising a head or support 20, side rails 21, an end frame 22, and a brace 23, all rigidly connected together.

A carriage 25 is supported on grooved rolls 26 (Fig. 2) which travel on the beveled upper edges of the front and back side rails 21. The carriage 25 comprises a rigid V-shaped frame having oppositely inclined guideways 30 for front and rear transfer slides 31 and 31a. As the construction and operation of these slides is identical, a description of the front slide will be understood to cover also the construction and operation of the rear slide.

Head and tail movable gripper fingers 32 and 33 (Fig. 4) are mounted on brackets 35 which are secured in longitudinally adjusted position on a three-armed main or operating lever 36 which is pivoted at 37 to the slide 31.

Air cylinders 38 operate through usual connections to rock the movable gripper fingers 32 and 33 relative to associated fixed gripper elements 34.

Air cylinders 38a (Fig. 2) similarly operate the rear gripper fingers.

The right-hand arm 36a (Fig. 4) of the main lever 36 has a roll 40 which is movable in a grooved cam block 41 fixed to the front of the carriage 25. The upwardly-extending arm 36b of the arm 36 has a roll 42 which enters a grooved cam plate 43 during the latter part of the downward movement of said roll 42. The cam plate 43 is also fixed to the carriage 25.

The front slide 31 (Fig. 4) is operated be a reversible front slide motor M3 mounted on the carriage 25 and connected by a worm 50 and worm gear 51 to a shift 53 which is provided with an arm 54 having a roll 55 at its upper end. The roll 55 is seated in a transverse slot or guideway 56 in a bracket 57 fixed to the slide 31. As the motor M3 swings the arm 54 and roll 55 to the left as viewed in Fig. 4, the roll 55 will travel in a downwardly directed arc, and the bracket 57 and slide 31 will be thereby moved downward in the guideways 30. Reversal of the front slide motor M3 will swing the arm 55 clockwise and will raise the slide 31.

Figure 9:
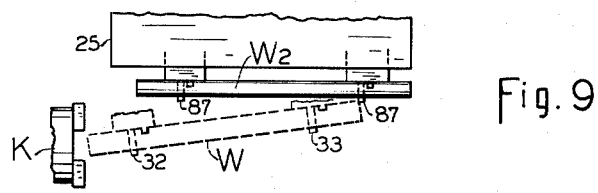

As the slide 31 moves downward, the coaction of the roll 40 with the fixed grooved cam plate 41 will rock the arm 36 anti-clockwise, so that the head fingers 32 will move downward more rapidly than the tail fingers 33 (Fig. 9). As the downward movement of the slide continues, the roll 40 will pass out of the lower end of the groove in the cam plate 41, and the roll 42 will have entered the groove in the cam plate 43. Further downward movement will rock the arm 36 clockwise (Fig. 10), restoring the fingers and the work W again to horizontal position (Fig. 11).

Successive operative positions of the work W as it is lowered to operative position and is also inserted in a driving member K and in alignment with the tail center T are shown in the motion diagram (Fig. 6). Successive positions of the opposite ends of the work-piece W during such insertion are indicated by the two sets of numerals 1 to 13 in said diagram. Several of these successive positions are also shown in Figs. 8 to 11.

Reference to these figures will make clear the operation of the cam plates 41 and 43 in Fig. 4, and comparison of the successive positions in Fig. 6 will show clearly that the left-hand or head end of the work-piece has a much more rapid downward movement during the first part of work insertion. It will also appear that the tail end of the work-piece moves downward more rapidly during the latter part of the insertion.

Figure 10:
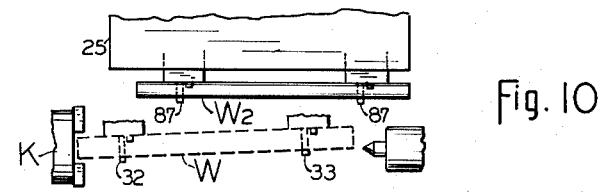
Figure 11:
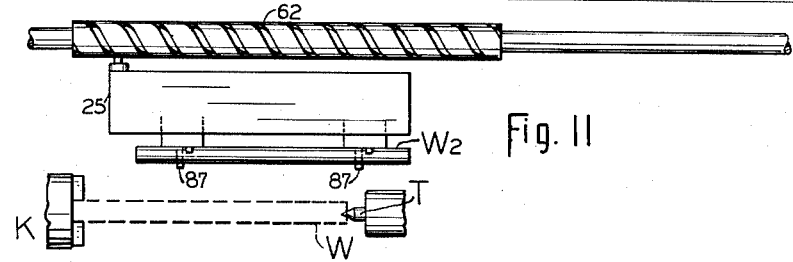

The net result is that the new work-piece W has a diving motion into the open jaws of the chuck K, as indicated in Figs. 9 and 10, after which the work-piece is aligned with the tail center T.

On removal of a finished piece of work W2 by the grippers of the rear slide, the relative movements are reversed and the tail end of the finished work-piece W2 rises more rapidly than the head end, which is substantially axially withdrawn from the work drive.

It will be seen from Fig. 2 that the front and rear slides are so inclined that when in lowermost positions, work-pieces held by either front or rear grippers will be accurately aligned with the lathe axis.

A rear slide motor M2 (Fig. 2) is provided for the rear slide 31a and corresponds in connections and operation to the motor M3 previously described.

Figure 12:
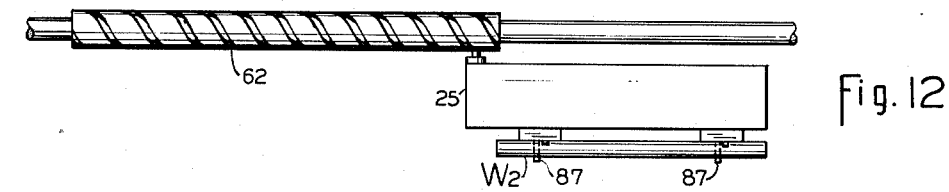
Figure 13:
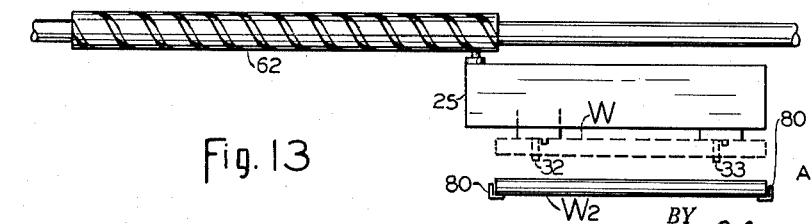

The carriage 25 (Fig. 1) has a cam roll 60 which is received in the helical groove 61 of a screw 62 by which the carriage 25 may be shifted from the loading position shown in Fig. 1 to the extreme right-hand or replenishing position indicated in Figs. 12 and 13. A reversible motor M5 is gear-connected to the screw 62 and rotates the screw to shift the carriage in a desired direction.

A main lathe motor M4 is provided for the lathe L and the operation of the lathe indicated in Fig. 1 is commonly controlled by a one-revolution cam, but such control forms no part of the present invention. The lathe tailstock has an operating cyclinder 64.

When the carriage is shifted to the right as indicated in Figs. 12 and 13, it is positioned above a replenishing device best shown in Fig. 7. This device comprises a front or loading runway 70 in which a plurality of pieces of new work W may be held in storage against an end abutment 71.

A loading cradle comprises arms 72 pivoted at 73 to the runway 70 and connected by a cross rod 74. One arm 72 is also pivoted at 72a to the piston rod 75a of an operating cylinder 75. At their free ends, the arms 72 have U-shaped end members 77 provided with V-shaped notches to receive the lowermost piece of stock W.

When the cylinder 75 is operated to pull down the pivot 72a, the loading cradle and the lowermost workpiece W will be raised into position to be gripped by the front fingers 32 and 33 previously described. After the work W is gripped, the loading cradle is promptly lowered.

A fixed discharge runway 80 is mounted at the rear of the replenishing mechanism, and receiving arms 82 are mounted on fixed pivots 83 and may be swung upward by a cylinder 85, all as previously described.

The arms 82 have U-shaped end members 87 with grooved recesses to receive a piece of finished work W2 when they are in raised position and as the rear fingers 33a are opened. The arms 82 will then be lowered to the position shown in Fig. 7 and during this lowering movement, the work W2 may roll to a discharge or removal position.

The replenishing mechanism herein shown is illustrative only and any suitable or available devices for presenting new work-pieces W and removing finished workpieces W2 may be substituted therefor.

Figure 8:
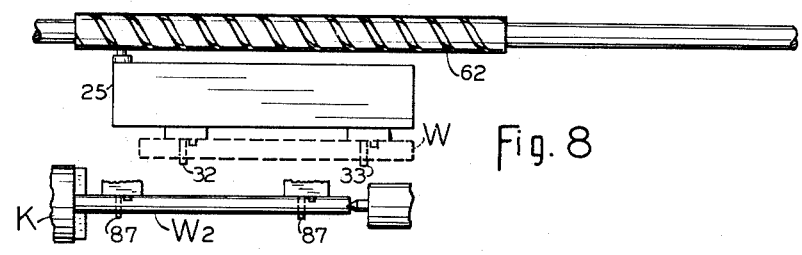
Figs. 8 to 13 are diagrammatic front views illustrating successive steps in the operation of the work-handling mechanism.

The successive work-handling operations indicated in Figs. 8 to 13 may now be briefly described as follows:

In Fig. 8, the work-piece W2 has been completed, the carriage 25 is in loading position, the rear slide is down with the grippers embracing the finished work, and a new piece of work W is held in the raised front grippers.

In Fig. 9 the finished work-piece W2 has been raised by the rear grippers and the new work-piece W in the front grippers is in process of insertion in the lathe.

Fig. 10 shows a further point in the insertion of the new work-piece W.

Fig. 11 shows the new work-piece W fully inserted in the chuck K and with the opposite end of the work-piece aligned with the tail center T.

In Fig. 12, the carriage 25 has been shifted to replenishing position while the lathe is operating on the new work-piece.

Also in Fig. 12 both slides are raised and the rear grippers still hold the finished work-piece W2.

In Fig. 13, the finished work-piece W2 has been deposited in the discharge runways 80, and a new workpiece W has been presented to the front grippers and has been grasped thereby.

The carriage 25 is now ready to return to the position indicated in Fig. 8, after which the front grippers will be lowered to grasp another finished work-piece.

The operation indicated in Fig. 8 is initiated after completion of the lathe operation and it is obvious that the carriage 25 must have completed its return movement to its head-end or operating position before a new cycle begins. Ordinarily there is ample time for replenishment during the lathe operation, but if otherwise, initiation of the new cycle will begin only after the carriage 25 has been fully returned to operative position.

Referring to the control and operation chart in Fig. 3, we have shown illustrative control mechanism which includes the rear motor M2 which operates the rear or unloading slide, the front motor M3 which operates the front or loading slide, the lathe motor M4 which rotates the work, and the screw motor M5 which drives the helically grooved drum or screw 62 which feeds the carriage 25 axially.

We have also indicated solenoid-operated double-throw switches S2, S3 and S5 for the motors M2, M3 and M5, and a single-throw switch S4 for the lathe-motor M4.

A series of solenoid-operated valves V10 to V19 inclusive are also indicated, and we have shown control solenoids for these switches and valves as connected to two circular series of contact points numbered 1 to 10 and A to F respectively.

The points 1 to 10 are positioned for engagement by an arm 100 mounted on a ratchet wheel 101. This wheel is advanced step-by-step by a pawl 102 mounted on a freely-pivoted lever 103 and given intermittent feeding movements by a spring 104.

The pawl 102 and lever 103 are moved backward after each feeding step by a magnet 105 which is energized as the next operation starts.

In the upper right-hand corner of Fig. 3, we have shown illustrative mechanism by which the arm 100 at each advance step will close the operative circuit of the magnet 105 through contact points 106 and a wire 107 which connects with a common ring 108 attached to the magnet 105 by a wire 109. Closing of the contact points 106 causes the magnet 105 to be energized and the feed arm 103 to be drawn backward one tooth. The other side of the magnet coil may be grounded or may have a return circuit not shown.

When the operation initiated from the engaged contact (as 1) is completed, the contacts 106 are momentarily separated by any suitable operation-controlled device, thus breaking the circuit of the magnet 105 and permitting the spring 104 acting through the arm 103 to feed the contact arm 100 forward or counterclockwise to the next contact point (as 2). It will be understood that the connections 106 and 107 and associated parts are repeated for each contact point.

General operation

The general operation may be briefly described as follows:

Assuming that the arm 100 is on contact 1, the rear motor M2 will be started in the direction to run the rear slide downward to the position in which the rear fingers can embrace the finished work-piece W2.

The arm 100 is then advanced to contact 2, which causes the rear fingers to close on the finished work (see Fig. 8). At contact 3, the work-driving chuck C is opened and the tail center T is withdrawn. At contact 4, the motor M2 is operated in reverse direction to run the rear slide up, thus removing the finished piece of work W2 which is grasped by the rear fingers.

At contact 5, the front motor M3 is operated to run the front slide down, with a new piece of stock held in the front fingers (see Figs. 9, 10 and 11).

Engagement of successive contacts 6, 7 and 8 then advance the tail center T, open the front fingers, and close the chuck K. Engagement of contact 9 then causes the front motor M3 to operate in reverse and to run the front slide up empty.

Engagement of contact 10 then starts the lathe motor M4 to rotate the work and to automatically perform any desired operations thereon. At the same time, the switch S5 is closed and causes the screw motor M5 to rotate in such a direction as to move the carriage tailwise to its replenishing position.

When the carriage has reached its replenishing position, the connection of the screw motor M5 to the contact 10 will be broken to stop the motor M5. At the same time, a holding circuit in a supplementary contact device K will be broken, allowing an arm 120 to be advanced from a blank pin F to a contact pin A which will cause a solenoid-operated valve V16 to effect the raising of a rear cradle under the finished work-piece W2. Successive advance movements of the arm 120 to the points B and C cause ethe rear fingers to be opened to release the finished work-piece W2, and the front fingers to be closed to grasp a new piece of work W raised by the front cradle. At contact D, both cradles return to their initial positions and a successive new work-piece rolls to replenishing position.

The next advance movement of the arm 120 to the contact point E establishes a reverse connection for the screw motor M5 and causes the carriage to be returned to the left or headwise to its original loading position.

When this movement is completed, the arm 120 is shifted to the blank point F where it remains until the next loading operation.

When the operation of the lathe is completed, the remaining circuit to the contact point 10 is broken by a cam which is mounted on the main one-revolution cam shaft in the lathe and which controls the operation thereof. The breaking of the "point-10" circuit stops the lathe motor M4 and causes the arm 100 to be advanced to the contact pin 1 to initiate a new cycle of operations.

It will be understood that the supplemental device with the contact points A to F is similar in construction and operation to the main contact device with the contact points 1 to 10.

Conclusion

The work-handling mechanism herein shown and described has important advantages in use and operation. It will be noted that the storage for new work-pieces and the provision for discharge and removal of finished work-pieces is substantially removed axially from the working locus of the machine, so that these features do not interfere with the operator at the working locus. When the carriage returns to its head-end position, it is substantially raised above the machine tool and has no parts projecting substantially forward or toward the operator. The cam control of the downward movement of the work-piece permits it to be inserted in the work-driving member, which is not possible where the transfer movement is directly downward. The replenishing devices are operative simultaneously with the work cycle. The entire control is automatic and the machine operation is or may be continuous.

Having thus described our invention and the advantages thereof, we do not wish to be limited to the details herein disclosed, otherwise than as set forth in the claims, but what we claim is:

1. In a work-handling mechanism for a machine tool having an axially-defined working locus, that improvement which comprises a work slide, means to support said slide, means to move said slide downward along a path inclined toward the head end of the machine tool and in a plane parallel to the axis of the working locus, a member mounted on a horizontal pivot on said slide, grippers on said pivoted member for holding an elongated work-piece, and means to give said member rocking movements on said slide and in opposite directions successively and both during continued downward movement of said slide, whereby the work-piece is inserted in driving position in the machine tool.

2. In a work-handling mechanism for a machine tool having an axially-defined working locus, that improvement which comprises a work slide, means to support said slide, means to move said slide downward along a path inclined toward the head end of the machine tool and in a plane parallel to the axis of the working locus, a member mounted on a horizontal pivot on said slide, spaced grippers on said member for holding an elongated work-piece, and means to give said member a rocking movement parallel to said plane which is timed to lower the head end of the work-piece more rapidly than the tail end during the first part of the downward movement of said slide and to move the head end more slowly than the tail end during the latter part of said downward movement, whereby the head end of the work-piece is inserted in said machine tool by a continuous movement which is first substantially downward and thereafter substantially horizontal and toward the head end of the machine tool.

3. A work-handling mechanism for a machine tool as set forth in claim 2, in which cam rolls are mounted on said member, and cams are fixed with respect to the slide support and are engaged by said rolls to give said member continued and reversely rocking movements parallel to said plane to insert a work-piece in the machine tool with a diving movement.

4. A work-handling mechanism for a machine tool as set forth in claim 3, in which the pivoted member has a horizontal arm and an upwardly-extending arm on which the cam rolls are mounted and in which the cams comprise two separate cam plates engaged by said rolls.

5. In a work-handling mechanism for a machine tool having an axis on which a piece of work is rotated, that improvement which comprises a carriage, front and back separate work-removing and work-inserting devices on said carriage which are respectively in front of and behind said axis, and means to move said devices alternately along paths in planes parallel to said axis but oppositely inclined to the vertical and converging with respect to the work axis, and each device having means to locate a piece of work in alignment with the machine tool axis when said device is in extreme lowered position.

6. In a work-handling mechanism for a machine tool having an axis on which a piece of work is rotated and having a working locus, that improvement which comprises a carriage having a normal position axially adjacent said working locus and having a V-shaped section, front and rear work-handling slides mounted on front and rear surfaces of said carriage and located respectively in front of and behind the vertical plane of the work axis and movable downward in said carriage in converging paths, and means to give each slide a work-presenting movement in a direction parallel to the work axis and inclined downward toward the head end of said machine tool, each slide coacting with a work-piece in axial position in said machine tool when said slide is in extreme lowered position, and control means to insure series operation of said slides.

References Cited in the file of this patent

UNITED STATES PATENTS

| | | |
|---|---|---|
| 1,841,988 | Smith et al. | Jan. 19, 1932 |
| 1,933,225 | Smith | Oct. 31, 1933 |
| 1,993,754 | Smith | Mar. 12, 1935 |
| 2,352,726 | Maulding | July 4, 1944 |
| 2,623,429 | Meyer et al. | Dec. 30, 1952 |
| 2,643,570 | Siekmann | June 30, 1953 |